Dec. 16, 1930.  A. F. PIEPER  1,785,558
UNIVERSAL JOINT
Filed Feb. 23, 1923
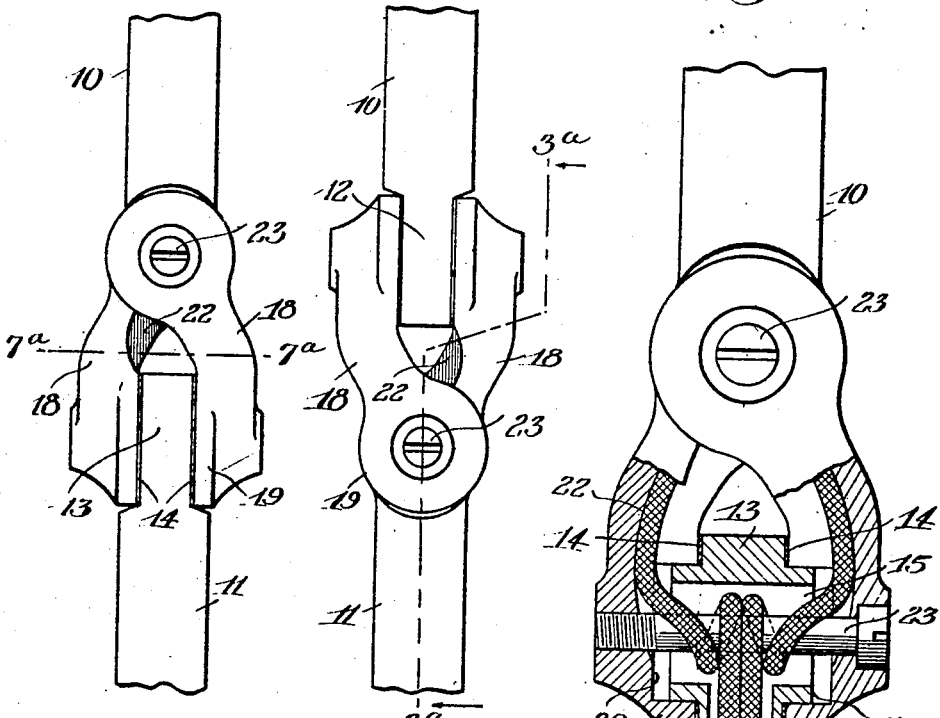
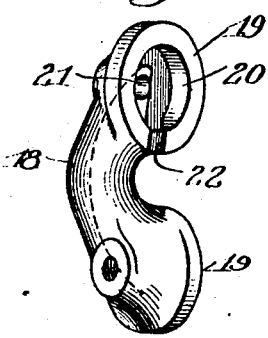
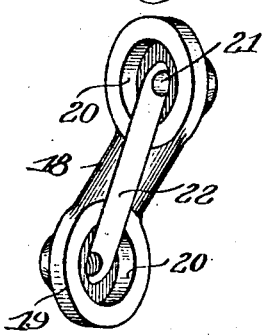
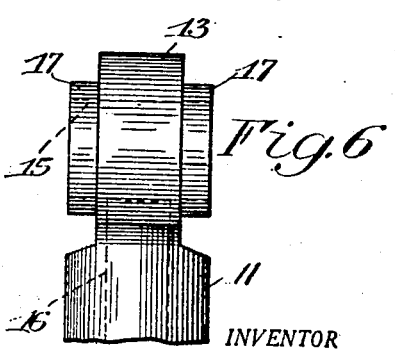
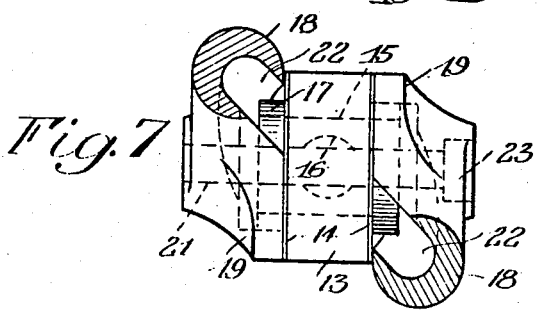
INVENTOR
Alphonse F. Pieper
BY Fredrich F. Church
his ATTORNEY Patented Dec. 16, 1930

1,785,558

UNITED STATES PATENT OFFICE

ALPHONSE F. PIEPER, OF ROCHESTER, NEW YORK

UNIVERSAL JOINT

Application filed February 23, 1923. Serial No. 620,700.

This invention relates to universal joints for connecting relatively movable sections of a flexible element, such, for example, as a shaft, supporting arm, conduit, or the like, the chief object of the invention being to provide a simple, efficient and economical connection of this character and one at the same time adapted for application to a tubular element or conduit in which wires or other conductors are carried. To these and other ends the invention resides in certain improvements and combinations of parts all as will be hereinafter more fully described, the novel features being pointed out in the claims at the end of the specification.

In the drawings:

Figure 1 is a side elevation of one form of universal joint embodying the present invention.

Figure 2 is a similar view as seen from the right in Figure 1.

Figure 3 is an enlarged sectional view substantially on the line 3a—3a of Figure 2.

Figures 4 and 5 are perspective views of connecting links employed in the present embodiment.

Figure 6 is an exterior view of an end of one of the conduit sections and

Figure 7 is a sectional view on the line 7a—7a in Figure 1.

Similar reference numerals throughout the several views indicate the same parts.

The embodiment of the invention at present preferred comprises a pair of sections 10 and 11 of a flexible element, having adjacent ends 12 and 13, respectively, to be movably connected together. Each of these section ends is preferably formed on opposite sides with bearing surfaces 14 in the present instance of annular shape and of sufficient area to afford a rigid and durable bearing. Centrally of these bearing surfaces each section end has a transverse opening 15 formed therein communicating with the interior or bore 16 of the section where the latter is in the form of a tube or conduit. Between each bearing surface 14 and the adjacent end of opening 15 is a laterally projecting flange 17 for a purpose which will appear more fully hereafter.

Both of the adjacent section ends have the construction described above and these ends are arranged angularly with respect to each other. That is to say, the bearing surfaces and the pivotal axes about which they are formed lie in different, non-parallel planes, the axis of the bearing surface of one section being preferably turned through an angle of 90 degrees with reference to the axis of the other section, as shown.

The adjacent section ends, constructed and arranged as described above, are preferably connected by a pair of links 18 each formed with annular bearing surfaces 19 at each end for cooperation with the bearing surfaces of the sections, the links being of twisted form as shown to conform to the angular displacement of the bearing surfaces of the sections. Each link is thus adapted to have one end pivotally connected with a bearing surface on one side of one section and its other end pivotally connected with a side of the other section, the remaining sides of the sections being similarly connected by the other link 18.

When employed in conjunction with a tubular element or conduit each link is preferably hollowed out or chambered as at 20 centrally of its bearing surfaces and a bolt opening 21 is formed through each end of each link at the same center as shown, such openings in one link being preferably screw-threaded. Each link is furthermore slotted as at 22 to provide a channel of substantial depth along its inner side from one recess or chamber 20 to that at the opposite end of the link.

The links are assembled with the sections as shown in Figure 3 with their bearing surfaces secured to the bearing surfaces of the section ends by means of bolts or screws 23 passed through one link end, through the section opening 15 and screwed into the other link end to clamp the links to the sections with an adjustable degree of frictional contact. The laterally projecting flanges 17 of the sections which are in the form of trunnions fit into the recesses 20 of the links to center and hold these parts in proper relation and it is to be noted that a continuous passage is provided from opening 15 and the section bore through recess 20 and the channel 22 of the links for the reception of wires or other conductors 24.

The sections are thus connected together for universal movement by means of the simple form of link shown which provides for adjustment of the contact of the bearing surfaces and their frictional resistance to movement as is desirable where the connection is employed in a supporting arm to be moved to and retained in different positions. This form of construction is particularly suitable for use with a supporting element or arm in the form of a conduit such as frequently utilized for supporting lamps, the connection providing, as shown, a continuous enclosure for one or more wires or other conductors 24 passed through the conduit. The conductors, as shown in Figure 3, may be carried through one conduit section, given an anchoring turn about the bolt 23 and passed thence through the channels of the connecting links 18 to and about the bolt 23 of the other section and through the latter. The conductors are, by this construction, securely retained in the proper position in the conduit and at the same time fully housed, protected and concealed in a continuous path through the joint. The construction described is applicable to various uses other than that shown in the present embodiment and has the further advantages of accessibility, economy of weight and material and an ornamental appearance.

I claim as my invention:

1. The combination with a flexible conduit comprising relatively movable sections providing a housing for wires and having adjacent ends formed with pivotal axes arranged angularly with respect to each other, of a pair of twisted grooved links disposed on opposite sides of said ends and each having one end connected with one of said sections for pivotal movement about the corresponding pivotal axis and the other end connected with the other of said sections for movement about said pivotal axis thereof, to form a universal joint for said sections, the grooves in said links providing a passageway for wires passing through said conduit.

2. The combination with a pair of relatively movable conduit sections having their adjacent ends formed with opposed bearing surfaces and with lateral openings communicating with the bores of said conduit sections, said surfaces of one section end being disposed transversely to the surfaces of the other, of a pair of channeled links disposed on opposite sides of said opposed bearing surfaces and having bearing surfaces at opposite ends arranged transversely with respect to each other for cooperation with the bearing surfaces of said section ends, means for holding the bearing surfaces of said section ends and links together to form a universal joint for said sections, and electrical conductors housed in said conduit section and the channels in said links 3. The combination with a pair of relatively movable conduit sections having their adjacent ends each formed on opposite sides with annular bearing surfaces and centrally of the latter with lateral openings communicating with the bores of said conduit sections, said surfaces of one section end being disposed at an angle to the surfaces of the other, of a pair of separate links disposed on opposite sides of said angular bearing surfaces and each having bearing surfaces at its ends disposed at an angle to each other for cooperation with the corresponding bearing surfaces of said section ends, respectively, said links being provided at their inner sides with channels communicating with said lateral openings and adapted to receive and house electrical conductors carried in said conduit, and bolts for holding the bearing surfaces of said links pivotally seated on the surfaces of said conduit sections to form a universal joint for the latter.

4. The combination of a flexible conduit comprising spaced sections having opposed ends arranged in angular relationship, each section being provided with longitudinally and transversely extending passages in open communication, one with another, to provide means for housing wires, a pair of links having opposite ends arranged angularly with respect to each other for engaging the angularly arranged ends of said sections at opposite sides thereof to form a universal joint between the same, said links having longitudinally extending passages communicating with the transversely extending open passages of said opposed ends to provide wire housing means, and connecting means between the corresponding ends of the links.

5. The combination of a universal joint comprising spaced sections having passageways forming wire housings and also having opposed ends, each provided with parallel bearing surfaces and having a pair of trunnions projecting at right angles to said bearing surfaces, the axis of one pair of trunnions being disposed at an angle to that of the other pair, a pair of links between said sections for connecting the same to form a universal joint, said links having passageways forming wire housings and openings for receiving said trunnions and being provided with bearing surfaces engaging the bearing surfaces of said sections, the bearing surfaces at one end of said links being at an angle to the bearing surfaces at the opposite ends of the links, and means connecting the links to hold them in operative relationship to the bearing surfaces of said sections.

6. The combination of a universal joint comprising spaced sections having opposed ends, each provided with parallel bearing surfaces and having a pair of hollow trunnions projecting at right angles to said bearing surfaces, the axis of one pair of trunnions being disposed at an angle to that of the other pair, a pair of links between said sections for connecting the same to form a universal joint, said links having openings for receiving said trunnions and being provided with bearing surfaces at opposite ends arranged at an angle to each other for engaging the angularly arranged bearing surfaces of said sections, and connecting bolts for the corresponding ends of the links extending through the hollow trunnions of said sections.

ALPHONSE F. PIEPER.